United States Patent [19]

Rodefeld et al.

[11] Patent Number: 5,619,974
[45] Date of Patent: Apr. 15, 1997

[54] METHOD FOR FORMING A SIGNAL RELATING TO THE QUANTITY OF EXHAUST GAS RECIRCULATED IN AN INTERNAL COMBUSTION ENGINE

[75] Inventors: Frank Rodefeld, Lenting; Nikolaus Benninger, Vaihingen, both of Germany

[73] Assignee: Robert Bosch GmbH, Stuttgart, Germany

[21] Appl. No.: 587,080

[22] Filed: Jan. 16, 1996

[30] Foreign Application Priority Data

Jan. 26, 1995 [DE] Germany .................. 195 02 368.4

[51] Int. Cl.⁶ .................................. F02M 25/07
[52] U.S. Cl. ....................................... 123/571
[58] Field of Search ................... 123/416, 417, 123/478, 480, 494, 571

[56] References Cited

U.S. PATENT DOCUMENTS

| | | | |
|---|---|---|---|
| 4,762,109 | 8/1988 | Jeenicke | 123/571 |
| 4,942,860 | 7/1990 | Chujo et al. | 123/571 |
| 5,205,260 | 4/1993 | Takahashi et al. | 123/571 |
| 5,273,019 | 12/1993 | Matthews et al. | 123/571 |
| 5,379,744 | 1/1995 | Pischke et al. | 123/571 |
| 5,383,126 | 1/1995 | Ogawa et al. | 123/571 |
| 5,482,020 | 1/1996 | Shimizu et al. | 123/571 |

*Primary Examiner*—Willis R. Wolfe
*Attorney, Agent, or Firm*—Kenyon & Kenyon

[57] ABSTRACT

A method for forming a signal relating to the quantity of exhaust gas recirculated in an internal combustion engine. The signal for the quantity of recirculated exhaust gas is formed on the basis of a signal for the stream of fresh gas fed to the internal combustion engine and a signal for the entirety of the stream of gas fed to the internal combustion engine. The signal for the entirety of the stream of gas which is fed is formed from a series of characteristic operating variables. These characteristic operating variables include, inter alia, the pressure in the intake tract, which can either be detected by means of a sensor or be formed from standby signals. The signal for the quantity of recirculated exhaust gas can be provided with a dynamic correction signal. Furthermore, the signal for the quantity of recirculated exhaust gas can be used in an exhaust gas recirculation valve with position reporting facility to identify an adaptive correction signal.

10 Claims, 2 Drawing Sheets

5,619,974

1

METHOD FOR FORMING A SIGNAL RELATING TO THE QUANTITY OF EXHAUST GAS RECIRCULATED IN AN INTERNAL COMBUSTION ENGINE

BACKGROUND INFORMATION

German Patent Application No. DE 35 03 798 A1 describes a method and a device in which the quantity of recirculated exhaust gas is identified from values for the pressure in the intake port of the internal combustion engine with the exhaust gas recirculation system switched on and with it switched off.

German Patent No. DE 28 49 554 C2 describes a device for specifying the composition of the gas content and the volumetric efficiency of cylinders in internal combustion engines. In this device, a mixture of fresh air and recirculated exhaust gas is adjusted, inter alia, as a function of the entire charge of the cylinder. The entire charge of the cylinder is identified by the round-about means of measuring pressure and temperature in the intake manifold.

SUMMARY OF THE INVENTION

The present invention has the object of forming a signal which is associated with the quantity of exhaust gas recirculated in an internal combustion engine.

The method according to the present invention has the advantage that it permits a signal relating to the quantity of exhaust gas recirculated in an internal combustion engine to be determined with a low degree of complexity.

DETAILED DESCRIPTION

Figure 1:
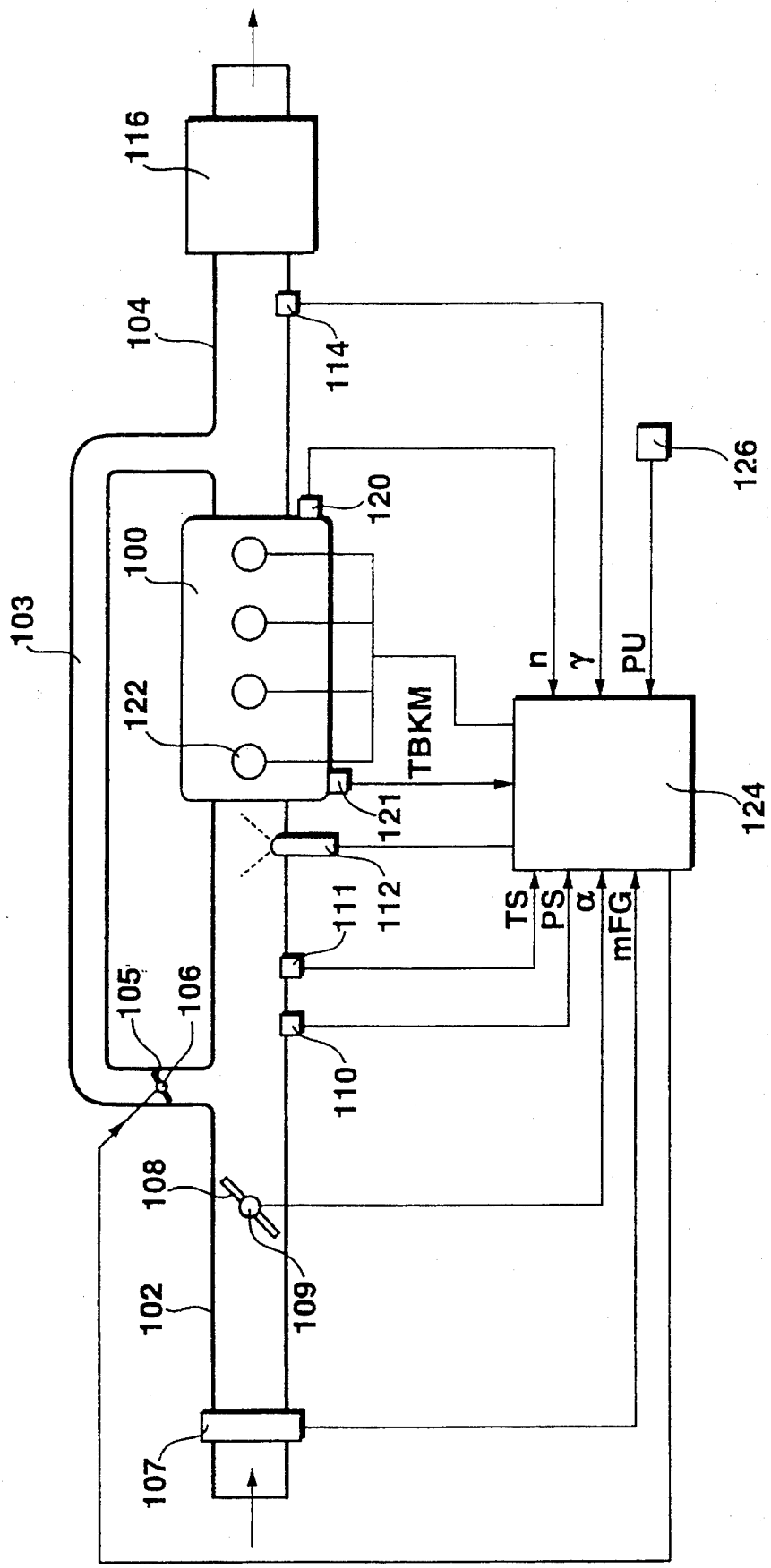
FIG. 1 shows an internal combustion engine with an exhaust gas recirculation system.

FIG. 1 shows an internal combustion engine with an exhaust gas recirculation system. An air/fuel mixture is fed to the internal combustion engine 100 via an intake tract 102 and the exhaust gases are discharged into an exhaust gas port 104. The intake tract 102 and the exhaust gas port 104 are connected to one another by means of a pipe 103 via which exhaust gas can pass from the exhaust gas port into the intake tract. An exhaust gas recirculation valve 105, with which the pipe 103 can be closed to a greater or lesser degree, is arranged in the pipe 103, so that, depending on the degree of opening of the exhaust gas recirculation valve 105, a lesser or greater quantity of exhaust gas can be recirculated from the exhaust gas port 104 into the intake tract 102 through the pipe 103. The exhaust gas recirculation valve 105 is provided with a drive 106 which sets the degree of opening of the exhaust gas recirculation valve 105.

2

Provided in the intake tract 102 are, viewed in the direction of flow of the sucked-in air, an air flow rate meter 107, for example a hot-film air flow rate meter, a throttle valve 108 with a sensor 109 for detecting the opening angle of the throttle valve 108, a pressure sensor 110 for detecting the intake manifold pressure, a temperature sensor 111 for detecting the temperature of the intake manifold and at least one injection nozzle 112 for supplying fuel. Arranged in the exhaust gas port 104 are, viewed in the direction of flow of the exhaust gas, an exhaust gas probe 114 and a catalytic converter 116. A rotational speed sensor 120 and a temperature sensor 121 are provided on the internal combustion engine 100. Furthermore, the internal combustion engine 100 has, for example, four spark plugs 122 for igniting the air/fuel mixture in the cylinders.

The output signals MFG of the air flow rate meter 107, $\alpha$ of the sensor 109 for detecting the opening angle of the throttle valve 108, PS of the pressure sensor 110, TS of the temperature sensor 111, $\lambda$ of the exhaust gas sensor 114, n of the rotational speed sensor 120 and TBKM of the temperature sensor 121 are fed to a central control unit 124 via corresponding connection lines. Furthermore, the output signal PU of a pressure sensor 126 which detects the ambient pressure is fed to the central control unit 124. The control unit 124 evaluates the sensor signals and, accordingly, actuates the drive 106 of the exhaust gas recirculation valve 105, the injection nozzle or injection nozzles 122 and the spark plugs 122.

The signal mAG, formed in the control unit 124 by means of the method according to the invention, for the quantity of recirculated exhaust gas can be used in particular to control or regulate the degree of opening of the exhaust gas recirculation valve 105. The control unit 124 produces the signal mAG on the basis of several of the above-mentioned sensor signals. The particular procedure adopted here is explained with reference to FIGS. 2, 3 and 4.

Figure 2:
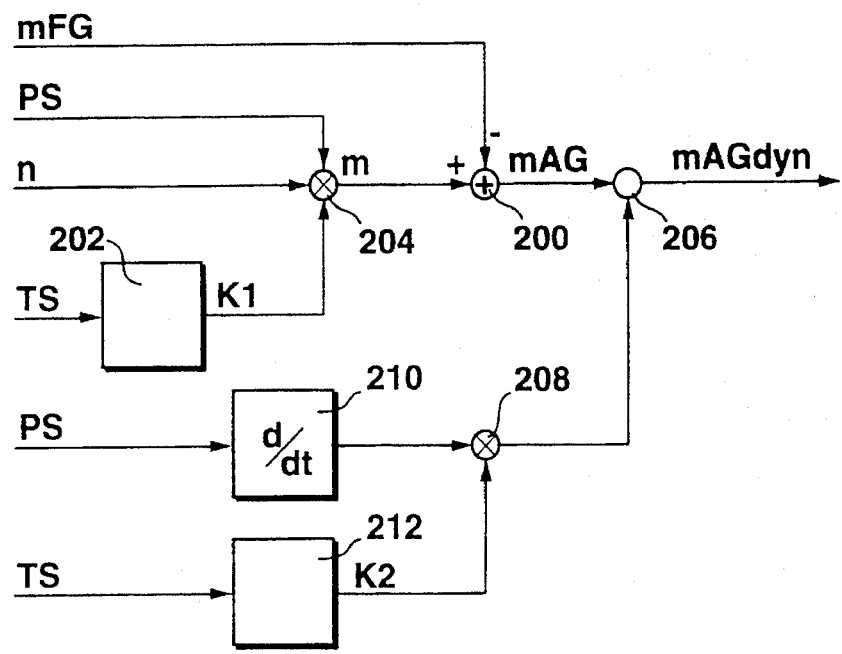
FIG. 2 shows a block circuit diagram of a first exemplary embodiment of the method according to the present invention.

FIG. 2 shows a block circuit diagram of a first exemplary embodiment of the method according to the present invention. In the method according to the present invention, use is made, inter alia, of the fact that the entire stream of gas in the intake tract 102 downstream of the entry of the pipe 103 is composed of a stream of fresh gas flowing through the air flow rate meter 107 and a stream of exhaust gas flowing through the pipe 103. The stream of fresh gas is represented by the signal mFG which is produced by the air flow rate meter 107. A signal mAG which is not measured directly but is formed by means of the method according to the present invention is assigned to the stream of exhaust gas through the pipe 103. The entire stream of gas, that is to say the stream of gas after the combination of the stream of fresh gas (signal mFG) and the stream of exhaust gas (signal mAG), is represented by a signal m. The signal m is usually identified by indirect measurements, for example by means of the intake manifold pressure (signal PS), the intake manifold temperature (signal TS) and the rotational speed (signal n). If two of the three signals mFG, mAG and m are known, the unknown third signal can be identified from them.

Using the method according to the present invention, the stream of exhaust gas mAG is usually determined from the entire stream of gas m and the stream of fresh gas mFG. For this purpose, according to FIG. 2, the signal m is fed to a first input of a logic element 200 and the signal mFG is fed to the second input of the logic element 200. At the logic element 200, the signal mFG is subtracted from the signal m and in this way the signal mFG for the stream of exhaust gas through the pipe 103 is formed and made available at the output of the logic element 200. The signal mFG originates from the air flow rate meter 107. If appropriate, the signal mFG can be suitably conditioned or corrected before being fed into the logic element 200.

The signal m is usually not detected directly by measuring, but rather is produced on the basis of one or more sensor signals. In the present exemplary embodiment, the signal m is produced on the basis of the signal PS for the intake manifold pressure (pressure sensor 110), the signal m for the rotational speed (rotational speed sensor 120) and the signal TS for the intake manifold temperature (temperature sensor 111). For this purpose, the signal TS is fed into a characteristic curve 202 in which values for a parameter R1 are stored. The signal R1 which is output by the characteristic curve 202 is fed into a first input of a logic element 204 into whose second input the signal n is fed and into whose third input the signal PS is fed. The logic element 204 produces the signal m for the entire stream of gas by multiplying these three input signals and makes the signal m available at its output. The output of the logic element 204 is connected to the first input of the logic element 200.

The method described above supplies a signal mAG which, under steady-state operating conditions, represents the stream of exhaust gas flowing back through the pipe 103 with a good degree of approximation. In order to take into account nonsteady-state operating conditions, there is provision in the exemplary embodiment illustrated in FIG. 2 for the signal mAG to be fed to a first input of a logic element 206 at whose second input there is a signal which takes into account dynamic effects, i.e. those occurring under non-steady-state operating conditions. The signal for the dynamic effects is output by a logic element 208 whose first input is connected to the output of a differentiating stage 210 and whose second input is connected to the output of a characteristic curve 212.

The signal PS for the intake manifold pressure is present at the input of the differentiating stage 210, that is to say the temporal derivation of the signal PS is fed into the first input of the logic element 208. The signal TS for the intake manifold temperature is present at the input of the characteristic curve 212. As a function of this signal TS, the characteristic curve 212 outputs a signal K2 which is fed into the second input of the logic element 208.

In the exemplary embodiment which has been described above, the intake manifold pressure is detected by means of a pressure sensor 110 in the intake tract 102. The method according to the present invention can however also be carried out if such a pressure sensor 110 is not present. A block circuit diagram of this variant of the present invention is illustrated in FIG. 3.

Figure 3:
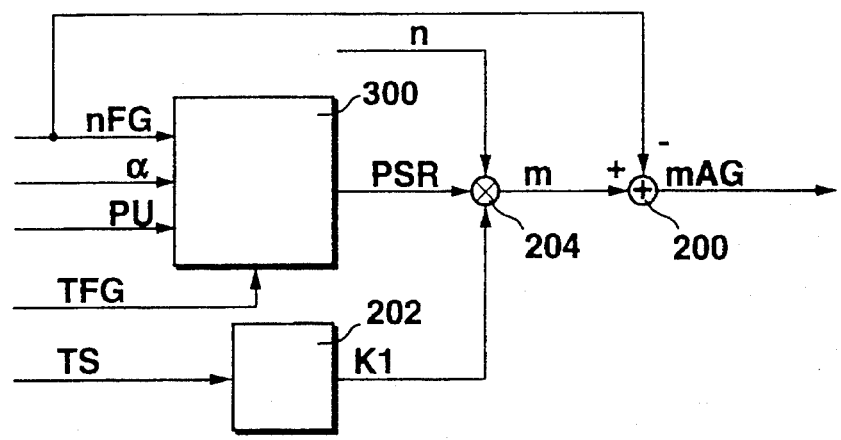
FIG. 3 shows a block circuit diagram of a second exemplary embodiment of the method according to the present invention.

FIG. 3 shows a block circuit diagram of a second exemplary embodiment of the present invention, in which a standby signal PSR for the intake manifold pressure is identified from the signals mFG for the stream of fresh gas, for the opening angle of the throttle valve 108, PU for the ambient pressure detected by the pressure sensor 126 and TFG for the temperature of the stream of fresh gas. The variable TS can usually be used for the temperature TFG. The signals mFG, and PU are each fed into one input of a characteristic diagram 300 in which the standby signal PSR is stored as a function of the three input signals. The standby signal PSR is made available at the output of the characteristic diagram 300.

The output of the characteristic diagram 300 is connected to the first input of the logic element 204 already illustrated in FIG. 2. The signals n and K1 are present at the two further inputs of the logic element 204, as in FIG. 2. The signal K1 is output, analogously to FIG. 2, by the characteristic curve 202 into which the signal TS is fed. The logic element 204 identifies the signal m from the signals n, PSR and K1 and makes the signal m available at its output. The signal m is fed into the first input of the logic element 200 at whose second input the signal mFG is present. The logic element 200 produces the signal mAG for the stream of exhaust gas from the two input signals by substraction.

In the exemplary embodiment illustrated in FIG. 3, the stream of exhaust gas recirculated through the pipe 103 is thus formed on the basis of the signals mFG for the stream of fresh gas, α for the opening angle of the throttle valve 108, PU for the ambient pressure detected by the pressure sensor 126 and TFG for the temperature of the stream of fresh gas. The variable TS can usually be used for the temperature TFG. The signals mFG, α and PU are each fed into one input of a characteristic diagram 300 in which the standby signal PSR is stored as a function of the three input signals. The standby signal PSR is made available at the output of the characteristic diagram 300. The output of the characteristic diagram 300 is connected to the first input of the logic element 204 already illustrated in FIG. 2. The signals n and K1 are present at the two further inputs of the logic element 204, as in FIG. 2. The signal K1 is output, analogously to FIG. 2, by the characteristic curve 202 into which the signal TS is fed. The logic element 204 identifies the signal m from the signals n, PSR and K1 and makes the signal m available at its output. The signal m is fed into the first input of the logic element 200 at whose second input the signal mFG is present. The logic element 200 produces the signal mAG for the stream of exhaust gas from the two input signals by substraction.

In the exemplary embodiment illustrated in FIG. 3, the stream of exhaust gas recirculated through the pipe 103 is thus formed on the basis of the signals mFG for the stream of fresh gas α for the opening angle of the throttle valve 108, PU for the ambient pressure, TS for the intake manifold temperature and n for the rotational speed of the internal combustion engine 100. In this exemplary embodiment, the pressure sensor 110 in the intake tract 102 can thus be dispensed with. However, the signal a for the opening angle of the throttle valve and the signal PU for the ambient pressure are required additionally, compared with the exemplary embodiment illustrated in FIG. 2. These two signals are, however, usually available in the control unit 124 in any case. The method is, however, restricted to engine operating points at which the velocity of sound is not reached at the throttle valve (subcritical pressure ratio at the throttle valve).

Figure 4:
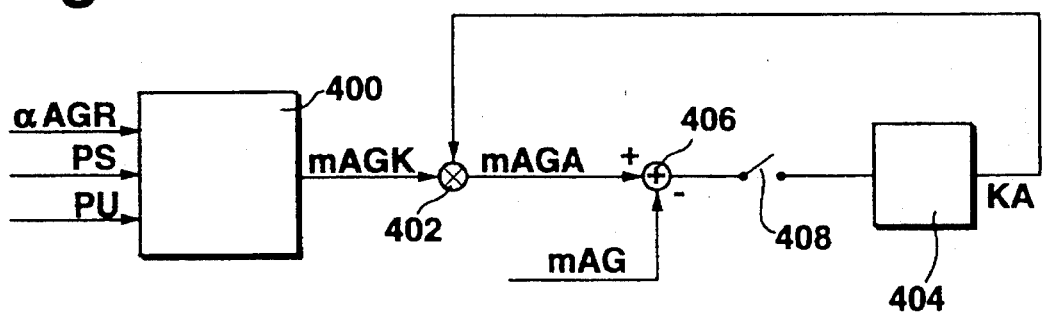
FIG. 4 shows a block circuit diagram of a third exemplary embodiment of the method according to the present invention.

FIG. 4 shows the block circuit diagram of a third exemplary embodiment which can be used in conjunction with an exhaust gas recirculation valve 105 which has a position reporting facility, that is to say a sensor which detects the opening angle αAGR of the exhaust gas recirculation valve 105. In this exemplary embodiment, the signal mAG, produced by means of the method according to the present invention, for the recirculated stream of exhaust gas is used to identify a signal KA for an adaptive correction value. The signal KA can be used to correct a signal mAGK which characterizes a characteristic diagram value for the recirculated stream of exhaust gas. The signal mAGR is produced using a characteristic diagram on the basis of the signal mAGR and the pressure signals PS and PU.

The signals αAGR, PS and PU are each fed into an input of a characteristic diagram 400. The characteristic diagram 400 outputs a characteristic diagram value mAGR in accordance with the input signals. The characteristic diagram value mAGK is fed into the first input of a logic element 402. The signal KA for the adaptive correction value which is output by a characteristic curve 404 is fed into the second input of the logic element 402. The logic element 402 forms, from the signal mAGK and the signal KA, a signal mAGA which characterizes an adaptively corrected value of the recirculated stream of exhaust gas. The signal mAGA is fed into a first input of a logic element 406 at whose second input the signal mAG is present. The logic element 406 subtracts the signal mAG from the signal mAGA and makes the difference between the two signals available at its output.

The output of the logic element 406 is connected to a first contact of a switch 408 whose second contact is connected to the input of the integrator 404. The switch 408 is always closed whenever the internal combustion engine 100 is experiencing steady-state operation and always open whenever the internal combustion engine 100 is experiencing in nonsteady-state operation. Thus, the signal KA for the adaptive correction value is identified only under steady-state operating conditions and is retained for subsequent nonsteady-state operating conditions.

The mode of operation of the circuit arrangement illustrated in FIG. 4 thus involves the signal KA for the adaptive correction value being varied during steady-state operation until the signal mAGA corresponds to the signal mAG. In this way, any errors in the detection of the opening angle $\alpha AGR$ of the exhaust gas recirculation valve 105 can be compensated.

What is claimed is:

1. A method for controlling an internal-combustion engine, comprising the steps of:
   providing a first signal indicative of a fresh gas stream sucked in by the internal-combustion engine;
   providing a second signal indicative of an entire gas stream sucked in by the internal-combustion engine as a function of at least one of a pressure prevailing in an intake tract, a temperature prevailing in the intake tract, and rotational speed of the internal-combustion engine;
   forming a third signal indicative of a quantity of exhaust gas recirculated in the internal-combustion engine as a function of the first and second signals; and
   controlling the internal-combustion engine as a function of the third signal.

2. The method according to claim 1, wherein the step of forming the third signal includes the step of subtracting the first signal from the second signal.

3. The method according to claim 1, further comprising the steps of:
   providing a dynamic correction signal as a function of at least one of the intake tract pressure and the intake track temperature; and
   using the dynamic correction signal to influence the third signal.

4. The method according to claim 3, further comprising the step of temporally differentiating the intake tract pressure.

5. The method according to claim 4, wherein the step of providing the dynamic correction signal includes the step of logically connecting the temporally differentiated pressure to a temperature signal dependent upon the intake tract temperature.

6. The method according to claim 1, further comprising the steps of:
   forming an adaptive correction signal as a function of the third signal;
   using a characteristic diagram to provide a fourth signal indicative of the quantity of recirculated exhaust gas; and
   correcting the fourth signal as a function of the adaptive correction signal.

7. The method according to claim 6, wherein the adaptive correction signal is formed under steady-state operating conditions of the internal-combustion engine.

8. The method according to claim 6, wherein the characteristic diagram includes the intake tract pressure, an ambient pressure, and a degree of opening of an exhaust gas recirculation valve arranged in a pipe connecting an exhaust gas port of the internal-combustion engine to the intake tract.

9. A method for controlling an internal-combustion engine, comprising the steps of:
   providing a first signal indicative of a fresh gas stream sucked in by the internal-combustion engine;
   providing a second signal indicative of an entire gas stream sucked in by the internal-combustion engine as a function of the first signal and at least one of an opening angle of a throttle valve, an ambient pressure, a rotational speed of the internal-combustion engine, and a temperature prevailing in an intake tract;
   forming a third signal indicative of a quantity of exhaust gas recirculated in the internal-combustion engine as a function of the first and second signals; and
   controlling the internal-combustion engine as a function of the third signal.

10. A device for controlling an internal-combustion engine, comprising:
    a first sensor for providing a first signal indicative of a fresh gas stream sucked in by the internal-combustion engine;
    at least one second sensor for sensing at least one of a pressure prevailing in an intake tract, a temperature prevailing in the intake tract, and a rotational speed of the internal-combustion engine; and
    a control unit for producing a second signal indicative of an entire gas stream sucked in by the internal-combustion engine as a function of the at least one of the intake tract pressure, the intake tract temperature, and the rotational speed of the internal-combustion engine; for forming a third signal indicative of a quantity of exhaust gas recirculated in the internal-combustion engine as a function of the first and second signals; and for controlling the internal-combustion engine as a function of the third signal.

* * * * *